US009304727B2

(12) United States Patent
Harada

(10) Patent No.: US 9,304,727 B2
(45) Date of Patent: Apr. 5, 2016

(54) NON-TRANSITORY COMPUTER-READABLE STORAGE MEDIUM AND METHOD OF ADDING PRINT FEATURE TO OUTPUT OF PRINTER DRIVER

(71) Applicant: Konica Minolta, Inc., Tokyo (JP)

(72) Inventor: Yoshiyuki Harada, Tokyo (JP)

(73) Assignee: KONICA MINOLTA, INC. (JP)

( * ) Notice: Subject to any disclaimer, the term of this patent is extended or adjusted under 35 U.S.C. 154(b) by 3 days.

(21) Appl. No.: 14/533,032

(22) Filed: Nov. 4, 2014

(65) Prior Publication Data
US 2015/0124276 A1 May 7, 2015

(30) Foreign Application Priority Data
Nov. 7, 2013 (JP) .................................. 2013-230873

(51) Int. Cl.
*G06F 3/12* (2006.01)
(52) U.S. Cl.
CPC ............ *G06F 3/1285* (2013.01); *G06F 3/1205* (2013.01); *G06F 3/1224* (2013.01)
(58) Field of Classification Search
CPC ..... G06F 3/048; G06F 3/1204; G06F 3/1205; G06F 3/1232; G06F 3/1246; G06F 3/1253; G06F 3/1254; G06F 3/1255; G06F 3/1285; G06F 3/1206; G06F 3/1248; G06F 3/1297; G06K 15/00
USPC .................................. 358/1.13, 1.15, 1.16, 1.9
See application file for complete search history.

(56) References Cited

U.S. PATENT DOCUMENTS

| | | | |
|---|---|---|---|
| 2006/0221361 A1* | 10/2006 | Takagi | 358/1.1 |
| 2009/0046318 A1* | 2/2009 | Sakikawa | 358/1.15 |
| 2010/0225958 A1* | 9/2010 | Selvaraj et al. | 358/1.15 |
| 2011/0026072 A1* | 2/2011 | Xiao et al. | 358/1.15 |
| 2011/0058199 A1* | 3/2011 | Kobayashi | 358/1.9 |
| 2011/0113321 A1* | 5/2011 | Han | G06F 3/1248 715/234 |
| 2011/0149314 A1* | 6/2011 | Kim | 358/1.9 |
| 2011/0242591 A1* | 10/2011 | Asai | 358/1.15 |
| 2011/0267628 A1* | 11/2011 | Nishihara | 358/1.6 |
| 2012/0147414 A1* | 6/2012 | Hutchings et al. | 358/1.15 |
| 2012/0188575 A1* | 7/2012 | Young et al. | 358/1.13 |
| 2013/0235402 A1* | 9/2013 | Yamamichi | 358/1.13 |
| 2013/0293924 A1* | 11/2013 | Armstrong et al. | 358/1.15 |

FOREIGN PATENT DOCUMENTS

JP 2011-023019 2/2011

* cited by examiner

*Primary Examiner* — Benny Q Tieu
*Assistant Examiner* — Juan M Guillermety
(74) *Attorney, Agent, or Firm* — Squire Patton Boggs (LLP)

(57) ABSTRACT

A non-transitory computer-readable storage medium stores a printer driver. The printer driver causes the processor of a computing device to function as a printer driver core section and a print setup user interface section and causes these sections to perform the following processing. The processing includes: defining an area in a PrintTicket to create a first PrintTicket, by the printer driver core section; operating a display section of the computing device to display the print setup screen, and incorporating another PrintTicket into the area of the first PrintTicket to create a second PrintTicket, by the print setup user interface section, where the another PrintTicket includes a description of information about another print feature having been inputted on the print setup screen. The processing further includes converting the second PrintTicket into a third PrintTicket which can be interpreted by the print device, by the printer driver core section.

18 Claims, 14 Drawing Sheets

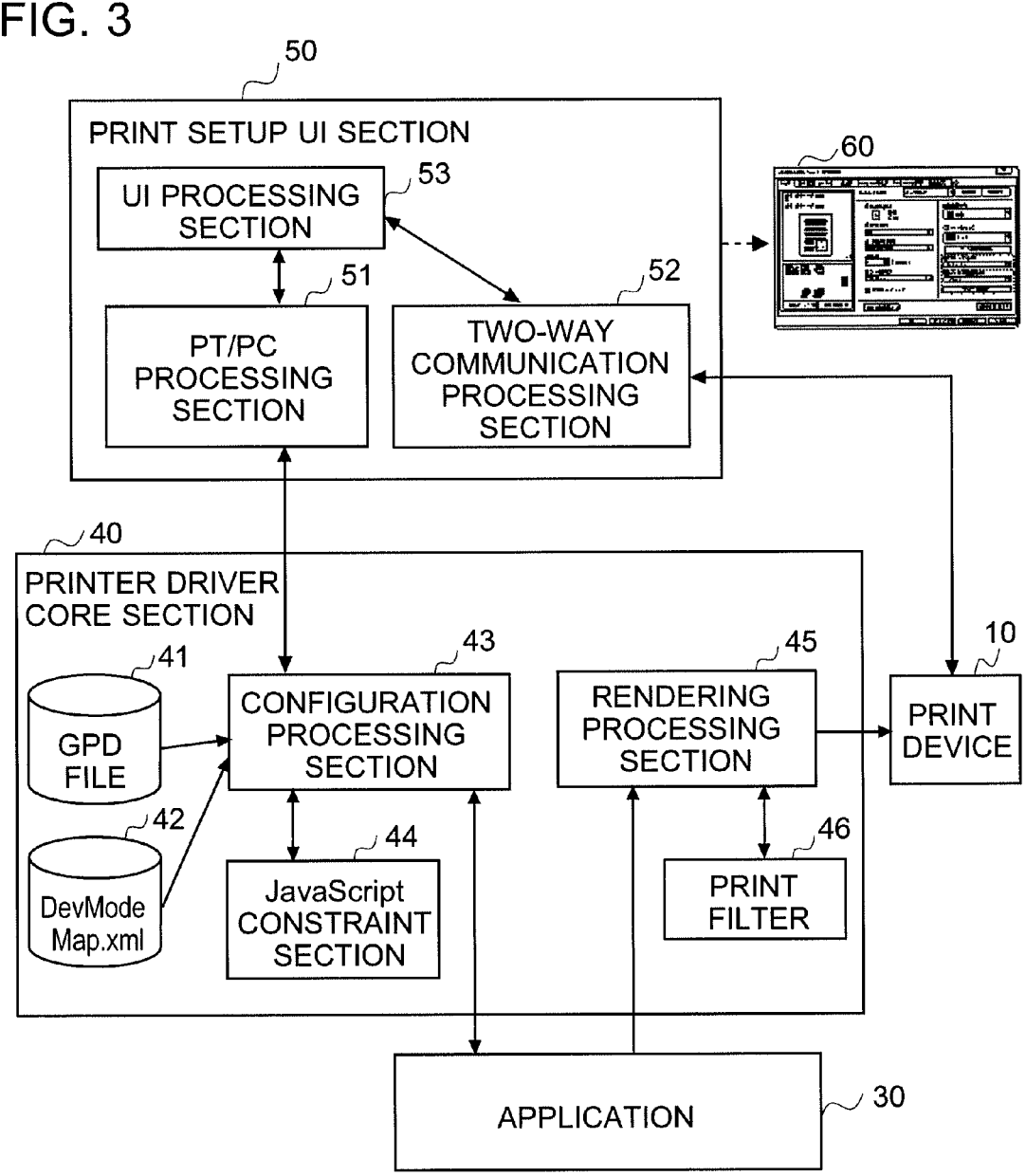

FIG. 4

```
*GPDFileName:"v4xxx.GPD"
*GPDFileVersion:"1.0"
*GPDSpecVersion:"1.0"
*Include:    "msxpsinc.gpd"
*ModelName:   "v4xxx Driver"
*MasterUnits: PAIR(1200,1200)
*PrinterType: PAGE
*MaxCopies:   999

*Feature:Orientation
{
   *rcNameID: =ORIENTATION_DISPLAY
   *DefaultOption: PORTRAIT
   *Option: PORTRAIT
   {
      *rcNameID: =PORTRAIT_DISPLAY
   }
   *Option: LANDSCAPE_CC90
   {
      *rcNameID: LANDSCAPE_DISPLAY
   }
}
*Feature PaperSize
{
   *rcNameID: =PAPER_SIZE_DISPLAY
   *DefaultOption: LETTER
   *Option: A4
   {
      *rcNameID: RCID_DMPAPER_SYSTEM_NAME
      *PrintableArea: PAIR(9520,13630)
      *PrintableOrigin: PAIR(200,200)
   }
   *Option: LETTER
   {
      *rcNameID: RCID_DMPAPER_SYSTEM_NAME
      *PrintableArea: PAIR(9800,12800)
      *PrintableOrigin: PAIR(200,200)
   }
}
            ⋮
```

FIG. 5

```
<?xml version="1.0" encoding=utf-8"?>
<Properties xmlns="http://schemas.microsoft.com/windows/2011/08/printing/devmodemap">
  <Property Name="JobPTExtra">
    <String Length="2048"></String>
  </Property>
</Properties>
```

FIG. 6A

```
function validatePrintTicket(printTicket,scriptContext)
{
  ...
}
function completePrintCapabilities(printTicket,scriptContext.printCapabilities)
{
  ...
}
function convertPrintTicketToDevMode(printTicket,scriptContext.devModeProperties)
{
  //SET VALUE TO DevMode Propertybag
  var currNode = printTicket.XmlNode.selectSingleNode("//psf:PrintTicket/psf:ParameterInit[@name='ns0000:JobPTExtra']");
  if(currNode != null) {
    var valueNode = currNode.selectSingleNode("psf:Value");
    devModeProperties.SetString("JobPTExtra",valueNode.text);
  }
}
```

FIG. 6B

```
function convertDevModeToPrintTicket(devModeProperties,scriptContext,printTicket)
{
    var JobPTExtra = devModeProperties.GetString("JobPTExtra");
    var currNode = printTicket.XmlNode.selectSingleNode("//psf:PrintTicket/psf:ParameterInit[@name='ns0000:JobPTExtra']");
    if(currNode == null) {
        //ADD NODE OF JobPTExtra TO PrintTicket
        var currNode = printTicket.XmlNode.selectSingleNode("//psf:PrintTicket");
        var newPropertyNode = printTicket.XmlNode.createNode(1,"psf:ParameterInit",currNode.namespaceURI);
        newPropertyNode.setAttribute("name","ns0000:JobPTExtra");
        var newValueNode = printTicket.XmlNode.createNode(1,"psf:Value",newPropertyNode.namespaceURI);
        var newValueAttribute = printTicket.XmlNode.createNode(2,"xsi:type",xsiNs);
        newValueAttribute.value = "xsd:string";
        newValueNode.setAttributeNode(newValueAttribute);
        newValueNode.text = JobPTExtra;
        newPropertyNode.appendChild(newValueNode);
        currNode.appendChild(newPropertyNode);
    } else {
        //SET VALUE GIVEN BY DevMode Propertybag
        var valueNode = currNode.selectSingleNode("psf:Value");
        ValueNode.text = JobPTExtra;
    }
}
```

FIG. 11

```
<?xmlVersion="1.0"?>
<psf:PrintTicket xmlns:psf="http://..."xmlns:xsl="http://..."xmlns:xsd="http://..."
version="1"xmlns:ns0000="http://..."xmlns:psk="http://...">
    <psf:Parameterinit name="psk:JobCopiesAllDocuments">
        <psf:Value xsi:type="xsd:integer">1</psf:Value>
    </psf:Parameterinit>
    <psf:Feature name="psk:PageMediaSize">
        <psf:Option name="psk:ISOA4">
            <psf:ScoredProperty name="psk:MediaSizeWidth">
                <psf:Value xsi:type="xsd:integer">210000</psf:Value>
            </psf:ScoredProperty>
            <psf:ScoredProperty name="psk:MediaSizeHight">
                <psf:Value xsi:type="xsd:integer">297000</psf:Value>
            </psf:ScoredProperty>
        </psf:Option>
    </psf:Feature>
    <psf:Feature name="psk:PageOrientation">
        <psf:Option name="psk:Portrait"/>
    </psf:Feature>
</psf:PrintTicket>>
```

FIG. 12

```
<?xmlVersion="1.0"?>
<psf:PrintTicket xmlns:psf="http://..."xmlns:xsl="http://..."xmlns:xsd="http://..."
version="1"xmlns:ns0000="http://..."xmlns:psk="http://...">
    <psf:ParameterInit name="psk:JobCopiesAllDocuments">
        <psf:Value xsi:type="xsd:integer">1</psf:Value>
    </psf:ParameterInit>
    <psf:Feature name="psk:PageMediaSize">
        <psf:Option name="psk:ISOA4">
            <psf:ScoredProperty name="psk:MediaSizeWidth">
                <psf:Value xsi:type="xsd:integer">210000</psf:Value>
            </psf:ScoredProperty>
            <psf:ScoredProperty name="psk:MediaSizeHight">
                <psf:Value xsi:type="xsd:integer">297000</psf:Value>
            </psf:ScoredProperty>
        </psf:Option>
    </psf:Feature>
    <psf:Feature name="psk:PageOrientation">
        <psf:Option name="psk:Portrait"/>
    </psf:Feature>
    <psf:ParameterInit name="ns0000:JobPTExtra">
        <psf:Value xsi:type="xsd:string">
        </psf:Value>
    </psf:ParameterInit>
</psf:PrintTicket>>
```

FIG. 13

```
<?xmlVersion="1.0"?>
<psf:PrintTicket xmlns:psf="http://..."xmlns:xsl="http://..."xmlns:xsd="http://..."
version="1"xmlns:ns0000="http://..."xmlns:psk="http://...">
    <psf:ParameterInit name="psk:JobCopiesAllDocuments">
        <psf:Value xsi:type="xsd:integer">1</psf:Value>
    </psf:ParameterInit>
    <psf:Feature name="psk:PageMediaSize">
        <psf:Option name="psk:ISOA4">
            <psf:ScoredProperty name="psk:MediaSizeWidth">
                <psf:Value xsi:type="xsd:integer">210000</psf:Value>
            </psf:ScoredProperty>
            <psf:ScoredProperty name="psk:MediaSizeHight">
                <psf:Value xsi:type="xsd:integer">297000</psf:Value>
            </psf:ScoredProperty>
        </psf:Option>
    </psf:Feature>
    <psf:Feature name="psk:PageOrientation">
        <psf:Option name="psk:Portrait"/>
    </psf:Feature>
    <psf:ParameterInit name="ns0000:JobPTExtra">
        <psf:Value xsi:type="xsd:string">
            <![CDATA[   <psf:ParameterInit name="ns0000:AuthUserID">
                    <psf:Value xsi:type="xsd:string">User_001</psf:Value>
                </psf:ParameterInit>
                    <psf:ParameterInit name="ns0000:AuthPassword">
                    <psf:Value xsi:type="xsd:string">qwerty</psf:Value>
                </psf:ParameterInit>
            ]]>
        </psf:Value>
    </psf:ParameterInit>
</psf:PrintTicket>>
```

FIG. 14

```
<?xmlVersion="1.0"?>
<psf:PrintTicket xmlns:psf="http://..."xmlns:xsl="http://..."xmlns:xsd="http://..."
version="1"xmlns:ns0000="http://..."xmlns:psk="http://...">
    <psf:ParameterInit name="psk:JobCopiesAllDocuments">
        <psf:Value xsi:type="xsd:integer">1</psf:Value>
    </psf:ParameterInit>
    <psf:Feature name="psk:PageMediaSize">
        <psf:Option name="psk:ISOA4">
            <psf:ScoredProperty name="psk:MediaSizeWidth">
                <psf:Value xsi:type="xsd:integer">210000</psf:Value>
            </psf:ScoredProperty>
            <psf:ScoredProperty name="psk:MediaSizeHight">
                <psf:Value xsi:type="xsd:integer">297000</psf:Value>
            </psf:ScoredProperty>
        </psf:Option>
    </psf:Feature>
    <psf:Feature name="psk:PageOrientation">
        <psf:Option name="psk:Portrait"/>
    </psf:Feature>
    <psf:ParameterInit name="ns0000:AuthUserID">
        <psf:Value xsi:type="xsd:string">User_001</psf:Value>
    </psf:ParameterInit>
    <psf:ParameterInit name="ns0000:AuthPassword">
      <psf:Value xsi:type="xsd:string">qwerty</psf:Value>
    </psf:ParameterInit>
</psf:PrintTicket>>
```

NON-TRANSITORY COMPUTER-READABLE STORAGE MEDIUM AND METHOD OF ADDING PRINT FEATURE TO OUTPUT OF PRINTER DRIVER

This application is based on Japanese Patent Application No. 2013-230873 filed on Nov. 7, 2013, in the Japan Patent Office, the entire content of which is hereby incorporated by reference.

TECHNICAL FIELD

The present invention relates to a non-transitory computer-readable storage medium storing a printer driver therein and a method of adding a print feature to output of a printer driver. In particular, the present invention relates to a non-transitory computer-readable storage medium storing a version 4 printer driver which is able to run on Windows operating systems (WINDOWS is a registered trademark of Microsoft Corporation in the United States and other countries, and the same shall apply hereinafter), and a method of adding a print feature to print instruction information outputted from the printer driver.

BACKGROUND

With regard to printer drivers which are able to run on Windows operating systems, Microsoft corporation (MICROSOFT is a registered trademark of Microsoft Corporation in the United States and other countries, and the same shall apply hereinafter) provides guidelines for hardware manufacturers. According to the guidelines, hardware manufacturers have provided version 3 printer drivers on the assumption the printer drivers work with Windows operation systems from Windows 2000 to Windows 7.

As the succeeding operating systems, there arrived Windows 8 and Windows Server 2012. Especially, since Windows 8 employs a metro-style user interface, which is a new and tile-like user interface, hardware manufacturers are developing version 4 printer drivers which employ a new printer driver architecture for those operation systems.

Such a version 4 printer driver model can be roughly divided into two layers of a printer driver core section and a print setup UI (User Interface) section as the structure. These two layers are designed so as to separate their processes from each other, which realizes that the two layers can be provided separately.

The printer driver core section provides print features for users and is composed of construction files including a GPD (Generic Printer Description) or PPD (PostScript Printer Description) file, a XML (Extensive Markup Language) file, a localization resource DLL (Dynamic Link Library); a print filter; and various modules including a JavaScript constraint section (JAVASCRIPT is a registered trademark of Oracle America, Inc.). The GPD/PPD file defines various print features, and the localization resource DLLs defines display strings (character strings) to be displayed in plural languages for each of the print features. The print filter is configured to edit rendering commands in rendering processing. The JavaScript constraint section handles a conflict among setup items about the print features.

The print setup UI section is independent from the printer driver core section, and provides a print setup screen by using print capability information called as PrintCapabilities and print setup information called as a PrintTicket, which are provided by the printer driver core section.

PrintCapabilities is described in the XML format and includes definitions of the various print features. As a concrete example, for an alternative-type feature (which requires a choice from plural optional items), PrintCapabilities includes descriptions about a feature, available options for the feature and display strings of the feature and the options. For a feature which requires an input of a string, PrintCapabilities includes descriptions about a parameter, a property such as the maximum number of characters and the minimum number of characters, and a display string for the name of the parameter.

A PrintTicket is described in the XML format and stores print setup information. The format of a PrintTicket (represented by elements of XML) is defined by the printer driver core section. By using information defined by a GPD/PPD file, an operation system adds XML elements into a PrintTicket automatically and a function in the JavaScript constraint section adds XML elements into a PrintTicket. The contents of a PrintTicket can be converted into a data structure called to as a DEVMODE structure by using the printer driver core section.

As an example of technologies relating to such a version 4 printer driver model, Japanese Unexamined Patent Publication (JP-A) No. 2011-023019 discloses the following information processing apparatus. The information processing apparatus is connected to an external device through a communication network. The information processing apparatus includes a receiving section, a status acquiring section, a resource acquiring section and a transmitting section. The receiving section is configured to receive a request from another image processing apparatus, where the request includes designations of both of information representing a display style of a display program set in the another information processing apparatus and information representing a type of a status. The status acquiring section is configured to acquire the value of the status corresponding to the type from the external device on the basis of the information representing the type of the status included in the request. The resource acquiring section is configured to acquire resource information corresponding to the information representing the display style of the display program included in the request. The transmitting section is configured to, in response to the request received by the receiving section, transmit the resource information acquired by the resource acquiring section and the status information according to the value of the status corresponding to the type, to the another information processing apparatus.

As described above, a version 4 printer driver includes a printer driver core section and a print setup UI section which are independent to each other. Therefore, to add a new print feature to a PrintTicket, there is a need to modify both of the printer driver core section and the print setup UI section to keep their consistency, which can cause a problem that a print feature is hardly added to such a PrintTicket.

In other words, since the format of a PrintTicket is defined by the printer driver core section as described above, even if the printer UI section adds a new print feature to a PrintTicket by editing the PrintTicket, the printer driver core section cannot recognize the added print feature and can drop the added print feature when converting the contents of the PrintTicket into a DEVMODE structure.

To add a print feature to a PrintTicket, there is a need to modify the printer driver core section (such as a modification of a main body of a program written in C language or other language). However, a modification of the printer driver core section needs a log acquisition of WHCK (Windows Hardware Certification Kit) and makes a great number of manhours. The present invention seeks to solve the above problem.

SUMMARY

There are disclosed illustrative non-transitory computer-readable storage media each storing a printer driver and methods to add a print feature to output of a printer driver.

An illustrative non-transitory computer-readable storage medium reflecting one aspect of the present invention stores a printer driver to be executed in a computing device being capable of instructing a print device to perform printing. The printer driver, when being executed by a processor of the computing device, causes the processor to function as a printer driver core section and a print setup user interface section and causes the printer driver core section and the print setup user interface section to perform the following processing. The processing comprises: creating a PrintTicket including a description of information about a print feature by the printer driver core section; defining an area for storing information in the PrintTicket by the printer driver core section, to create a first PrintTicket and send the first PrintTicket to the print setup user interface section; creating a print setup screen by using the first PrintTicket, by the print setup user interface section; operating a display section of the computing device to display the print setup screen, by the print setup user interface section; and creating another PrintTicket and incorporating the another PrintTicket into the area of the first PrintTicket, by the print setup user interface section, to create a second PrintTicket and send the second PrintTicket to the printer driver core section, where the another PrintTicket includes a description of information about another print feature having been inputted on the print setup screen. The processing further comprises converting the second PrintTicket into a third PrintTicket which can be interpreted by the print device, by the printer driver core section.

Another illustrative non-transitory computer-readable storage medium reflecting one aspect of the present invention stores a printer driver to be executed in a computing device being capable of instructing a print device to perform printing. The printer driver, when being executed by a processor of the computing device, causes the processor to function as a printer driver core section and a print setup user interface section and causes the printer driver core section and the print setup user interface section to perform the following processing. The processing comprises: creating a PrintTicket including a description of information about a print feature by the printer driver core section; defining an area for storing information in the PrintTicket by the printer driver core section, to create a first PrintTicket by and send the first PrintTicket to the print setup user interface section; creating a print setup screen by using the first PrintTicket, by the print setup user interface section; operating a display section of the computing device to display the print setup screen, by the print setup user interface section; and creating PJL commands and incorporating the PJL commands into the area of the first PrintTicket, by the print setup user interface section, to create a second PrintTicket and send the second PrintTicket to the printer driver core section, where the PJL commands include a description of information about another print feature having been inputted on the print setup screen. The processing further comprises converting the second PrintTicket into a third PrintTicket which can be interpreted by the print device, by the printer driver core section.

Another illustrative non-transitory computer-readable storage medium reflecting one aspect of the present invention stores a printer driver to be executed in a computing device being capable of instructing a print device to perform printing. The printer driver, when being executed by a processor of the computing device, causes the processor to function as a printer driver core section and a print setup user interface section and causes the printer driver core section and the print setup user interface section to perform the following processing. The processing comprises: creating a PrintTicket including a description of information about a print feature by the printer driver core section; defining an area for storing information in the PrintTicket by the printer driver core section, to create a first PrintTicket by and send the first PrintTicket to the print setup user interface section; creating a print setup screen by using the first PrintTicket, by the print setup user interface section; operating a display section of the computing device to display the print setup screen, by the print setup user interface section; and creating first PJL commands and incorporating the first PJL commands into the area of the first PrintTicket, by the print setup user interface section, to create a second PrintTicket and send the second PrintTicket to the printer driver core section, where the first PJL commands includes a description of information about another print feature having been inputted on the print setup screen. The processing further comprises converting the second PrintTicket into second PJL commands which can be interpreted by the print device, by the printer driver core section.

A method of a printer driver reflecting one aspect of the present invention is a method of adding a print feature to output of a printer driver to be executed in a computing device being capable of instructing a print device to perform printing. The method comprises: creating a PrintTicket including a description of information about a print feature; defining an area for storing information in the PrintTicket, to create a first PrintTicket; creating a print setup screen by using the first PrintTicket; operating a display section of the computing device to display the print setup screen; and creating another PrintTicket and incorporating the another PrintTicket into the area of the first PrintTicket, to create a second PrintTicket, where the another PrintTicket includes a description of information about another print feature having been inputted on the print setup screen. The method further comprises converting the second PrintTicket into a third PrintTicket which can be interpreted by the print device.

Another method of a printer driver reflecting one aspect of the present invention is a method of adding a print feature to output of a printer driver to be executed in a computing device being capable of instructing a print device to perform printing. The method comprises: creating a PrintTicket including a description of information about a print feature; defining an area for storing information in the PrintTicket, to create a first PrintTicket; creating a print setup screen by using the first PrintTicket; operating a display section of the computing device to display the print setup screen; and creating PJL commands and incorporating the PJL commands into the area of the first PrintTicket, to create a second PrintTicket, where the PJL commands include a description of information about another print feature having been inputted on the print setup screen. The method further comprises converting the second PrintTicket into a third PrintTicket which can be interpreted by the print device.

Another method of a printer driver reflecting one aspect of the present invention is a method of adding a print feature to output of a printer driver to be executed in a computing device being capable of instructing a print device to perform printing. The method comprises: creating a PrintTicket including a description of information about a print feature; defining an area for storing information in the PrintTicket, to create a first PrintTicket; creating a print setup screen by using the first PrintTicket; operating a display section of the computing device to display the print setup screen; and creating first PJL commands and incorporating the first PJL commands into the area of the first PrintTicket, to create a second PrintTicket, where the first PJL commands include a description of information about another print feature having been inputted on the print setup screen. The method further comprises converting the second PrintTicket into second PJL commands which can be interpreted by the print device.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 3 is a functional block diagram of a computing device relating to Example 1;

FIG. 4 illustrates an example of a GPD file relating to Example 1;

FIG. 5 illustrates an example of a "DevModeMap.xml" file relating to Example 1;

FIGS. 6A and 6B illustrate an example of descriptions of processing executed by a JavaScript constraint section relating to Example 1;

FIG. 11 illustrates an example of PrintTicket(0) relating to Example 1;

FIG. 12 illustrates an example of PrintTicket(1), which is prepared by defining a certain area into PrintTicket(0), relating to Example 1;

FIG. 13 illustrates an example of PrintTicket(2), which is prepared by incorporating a PrintTicket defining an additional print feature in the CDATA format into the area of PrintTicket(1), relating to Example 1;

FIG. 14 illustrates an example of PrintTicket(3), which is prepared by converting PrintTicket(2) into a format which can be interpreted by a print device, relating to Example 1;

DETAILED DESCRIPTION

Figure 1:
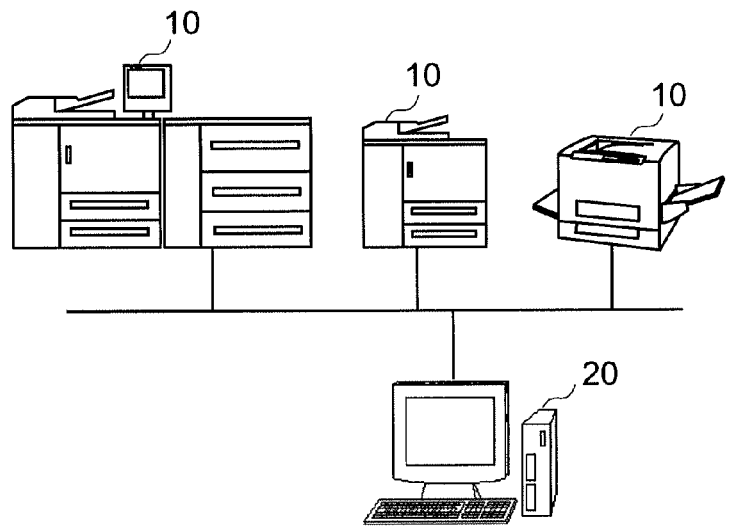
FIG. 1 is a diagram schematically illustrating a constitution of a printing system relating to Example 1.

Illustrative embodiments of non-transitory computer-readable storage media each storing a printer driver and methods to add a print feature to output of a printer driver will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

In one embodiment of the present invention, to add a print feature to print instruction information outputted from a printer driver composed of a print driver core section and a print setup UI section, the printer driver conducts the following control. The printer driver core section creates a first PrintTicket prepared by defining an area for adding a print feature therein and sends the first PrintTicket to the print setup UI section. The print setup UI section creates a second PrintTicket by creating a PrintTicket including a description of information about an additional print feature and incorporating the created PrintTicket into the defined area of the first PrintTicket, and sends the second PrintTicket to the printer driver core section. The printer driver core section coverts the second PrintTicket into a third PrintTicket which can be interpreted by a print device.

In one embodiment of the present invention, to add a print feature to print instruction information outputted from a printer driver, the printer driver conducts the following control. The printer driver core section creates a first PrintTicket prepared by defining an area for adding a print feature therein and sends the first PrintTicket to the print setup UI section. The print setup UI section creates a second PrintTicket by creating PJL (Print Job Language) commands including a description of information about an additional print feature and incorporating the created PJL commands into the defined area of the first PrintTicket, and sends the second PrintTicket to the printer driver core section. The printer driver core section coverts the second PrintTicket into a third PrintTicket which can be interpreted by a print device.

In one embodiment of the present invention, to add a print feature to print instruction information outputted from a printer driver, the printer driver conducts the following control. The printer driver core section creates a first PrintTicket prepared by defining an area for adding a print feature therein and sends the first PrintTicket to the print setup UI section. The print setup UI section creates a second PrintTicket by creating first PJL commands including a description of information about an additional print feature and incorporating the created first PJL commands into the defined area of the first PrintTicket, and sends the second PrintTicket to the printer driver core section. The printer driver core section coverts the second PrintTicket into second PJL commands which can be interpreted by a print device.

Therefore, the illustrative non-transitory computer-readable storage media each storing a printer driver and methods to add a print feature to print instruction information outputted from a printer driver as embodiments of the present invention, allow a user to add a new print feature to print instruction information, such as a PrintTicket and PJL commands, outputted from a printer driver easily.

As illustrated in the descriptions about the background, hardware manufactures provide printer drivers for Windows operating systems and are further developing version 4 printer drivers for new Windows operating systems such as Windows 8 and Windows Server 2012. Such a version 4 printer driver is composed of two layers including a printer driver core section and a print setup UI section, where the relationship of the printer driver core section and the print setup UI section is disclosed in, for example, "V4 Printer Driver White Paper", Sep. 28, 2012, Microsoft Corporation, retrieved from the Internet, "URL: http://msdn.microsoft.com/library/windows/hardware/br259124".

According to the disclosed "V4 Printer Driver White Paper", the printer driver core section (including a GPD/PPD file and JavaScript Constraints) is configured to define print settings, and create a PrintTicket and a PrintCapabilities as a result of the definition. A data exchange between the printer driver core section and the print setup UI section is conducted by using the PrintTicket, PrintCapabilities, and property bags.

Therefore, an addition of a print feature to a PrintTicket is necessarily conducted by the printer driver core section. Even if the print setup UI section adds a setting value of a new print feature to a node in a PrintTicket, since the print feature has not been defined by the printer driver core section, the information added into the PrintTicket may be lost in the process until print processing is actually conducted and an output of the print processing may reflect no additional information. In other words, to add a print feature to a PrintTicket, there is a need to modify the printer driver core section, but the modification of the printer driver core section needs a great number of man hours and it is difficult to add a print feature to a PrintTicket, which was a problem.

The above problem has been newly caused with the appearance of version 4 printer driver models, which are composed of the printer driver core section and the print setup UI section provided as separated layers. A way to solve the problem is now required on developing such the Version 4 printer drivers.

In view of the above problem, in order to provide a printer driver in which the print setup UI section can add a print feature to print instruction information, such as a PrintTicket and PJL commands, outputted by a printer driver, there is provided one embodiment which conducts the following processing. When creating a PrintTicket, the printer driver core section defines an area for adding a print feature thereto, in the PrintTicket. Then, the print setup UI section creates a PrintTicket or PJL commands including a description of a print feature and incorporates the PrintTicket or PJL commands created by the print setup UI section into the area of the PrintTicket received from the printer driver core section, to send the resulting PrintTicket to the printer driver core section. After that, the printer driver core section interprets the incorporated PrintTicket or PJL commands, converts the PrintTicket received from the print setup UI section into another PrintTicket or PJL commands which can be interpreted by a print device, and sends the converted PrintTicket or PJL commands to the print device to give an instruction of print processing to the print device.

Those processes do not require a modification of the printer driver core section (a modification of a main body of a printer driver program), and realizes an addition of an extra print feature to print instruction information with the print setup UI section just by conducting an addition of data and an addition of a JavaScript description, thereby, defining an area for storing information into a PrintTicket.

EXAMPLE

Figure 2:
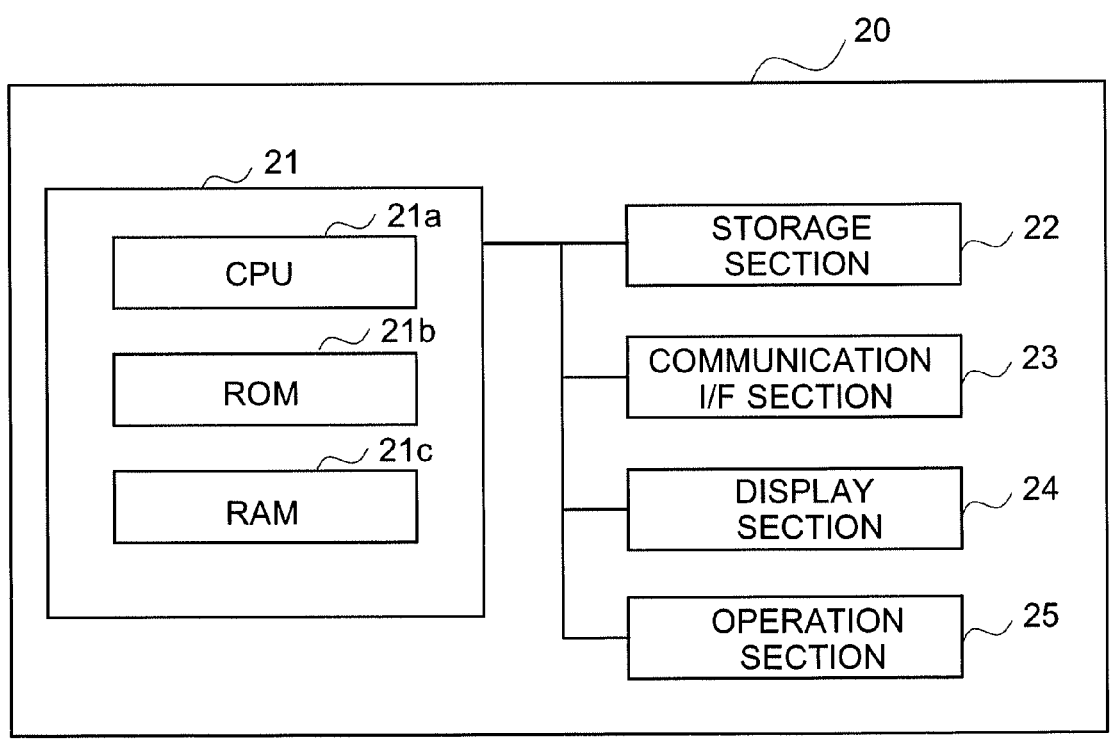
FIG. 2 is a block diagram illustrating a constitution of a computing device relating to Example 1.
Figure 7:
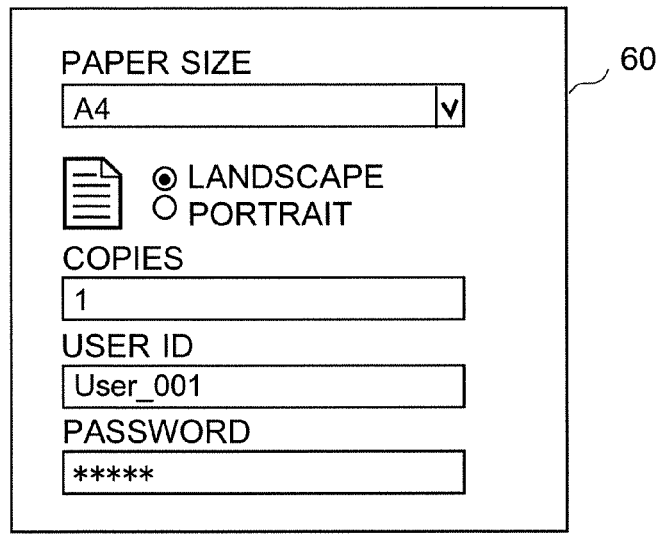
FIG. 7 illustrates an example of a print setup screen displayed by a print setup UI section relating to Example 1.
Figure 8:
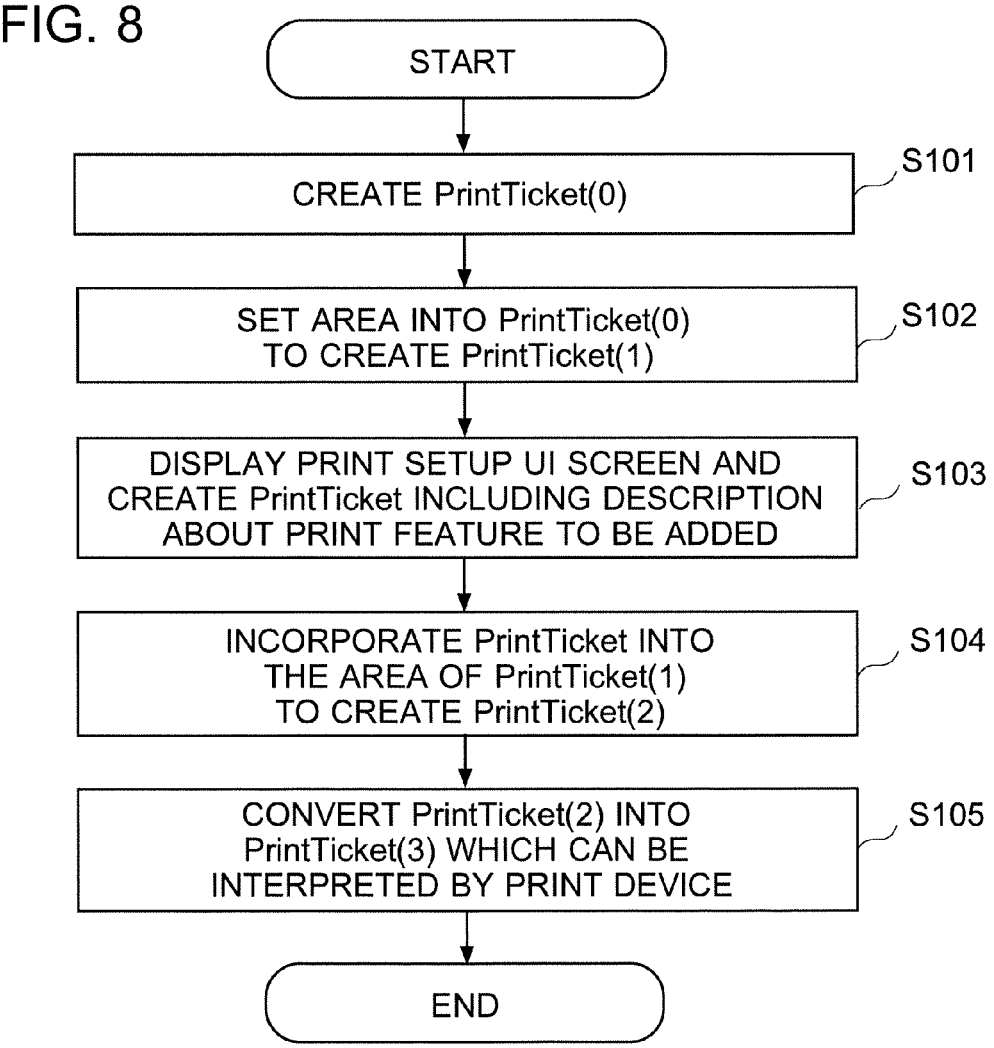
FIG. 8 is a flowchart illustrating processing of a printer driver relating to Example 1.
Figure 9:
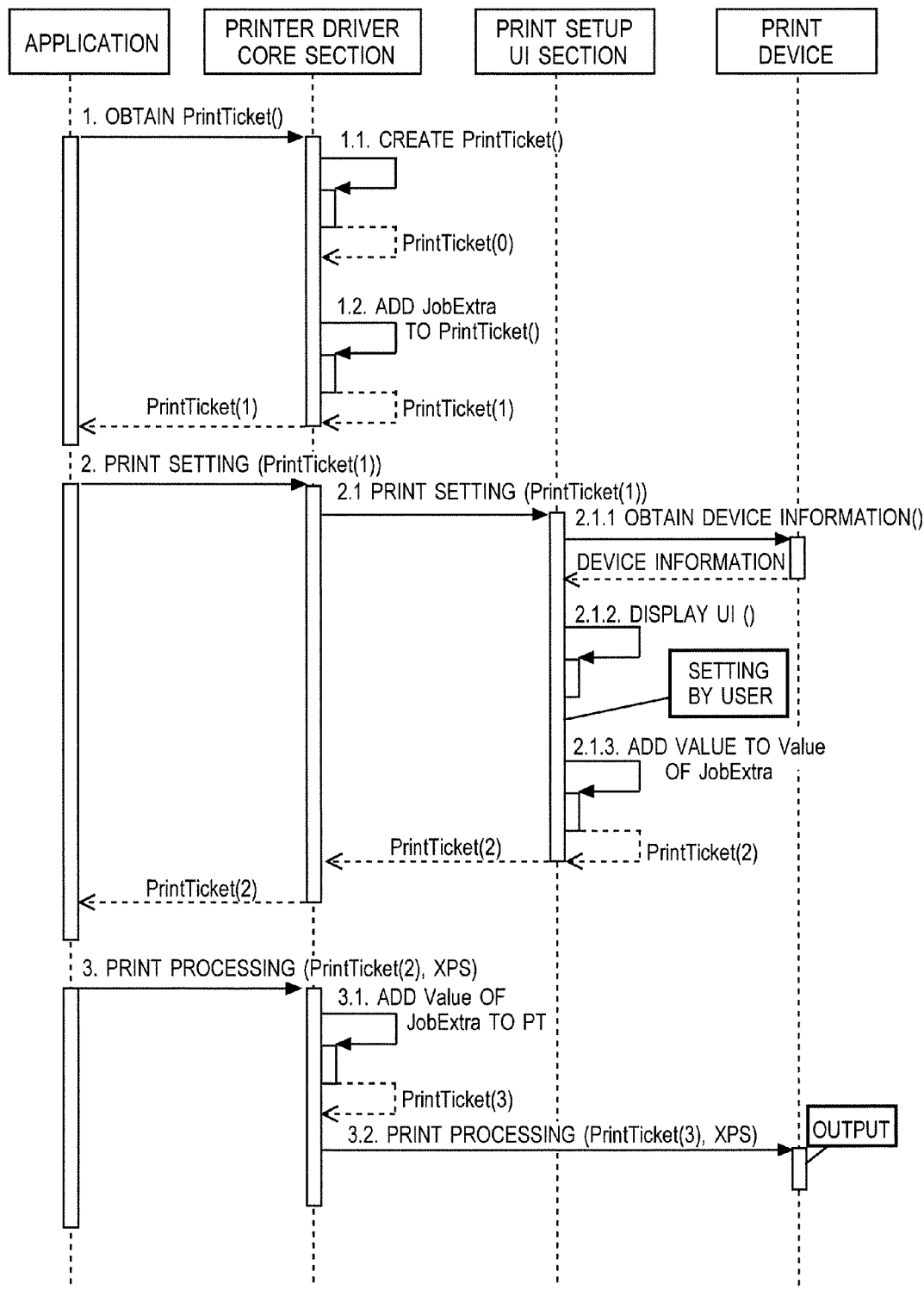
FIG. 9 is a sequence diagram illustrating data flow between functional components of the computing device (when the XPS print path is employed) relating to Example 1.
Figure 10:
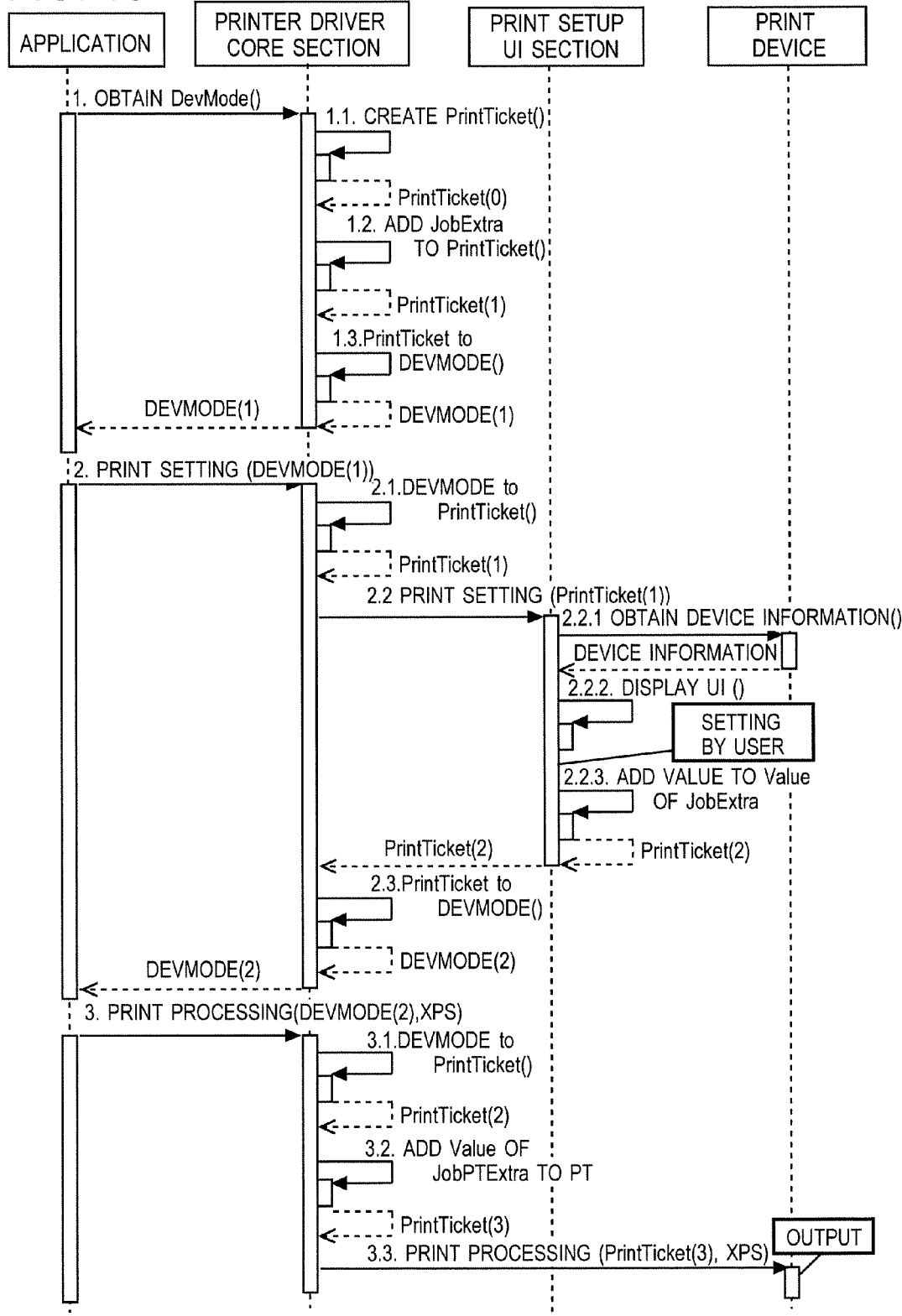
FIG. 10 is a sequence diagram illustrating data flow between functional components of the computing device (when the GDI print path is employed) relating to Example 1.
Figure 15:
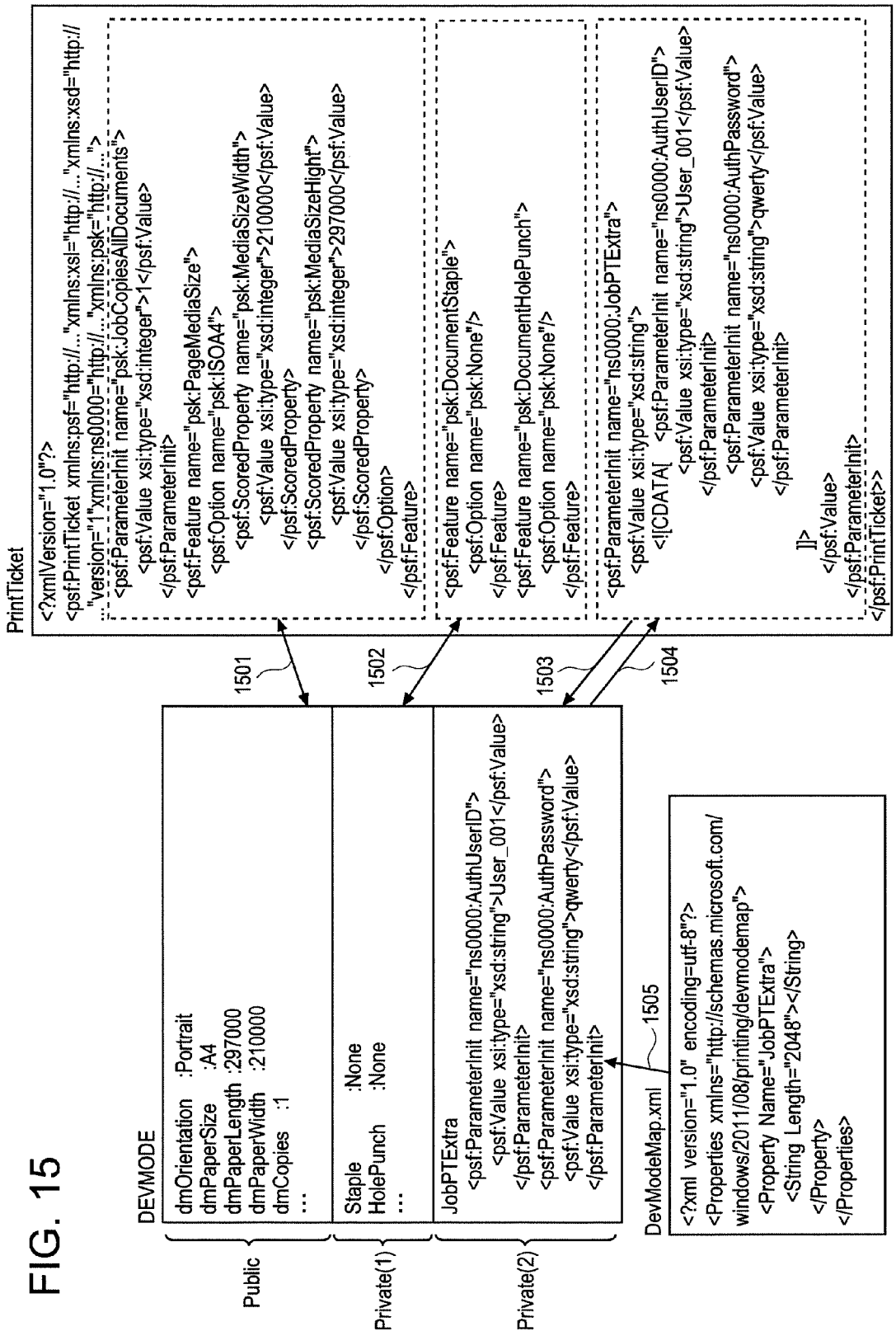
FIG. 15 illustrates an example of a mutual conversion between a PrintTicket and a DEVMODE structure, relating to Example 1.

In order to describe the above-mentioned embodiments in more detail, description will be given to a non-transitory computer-readable storage media each storing a printer driver and methods of adding a print feature to output of the printer driver pertaining to one example of the present invention with reference to FIGS. 1 to 15. FIG. 1 is a diagram schematically illustrating a constitution of a printing system of the present example. FIG. 2 is a block diagram illustrating a constitution of a computing device of the present example, and FIG. 3 is a functional block diagram of the computing device. FIG. 4 illustrates an example of a GPD file, and FIG. 5 illustrates an example of a "DevModeMap.xml" file. FIGS. 6A and 6B illustrate an example of descriptions of processing executed by the JavaScript constraint section. FIG. 7 illustrates an example of a print setup screen. FIG. 8 is a flowchart illustrating processing of a printer driver of the present example. Each of FIGS. 9 and 10 is a sequence diagram illustrating data flow between functional components of the computing device of the present example. Each of FIGS. 11 to 14 illustrates an example of a PrintTicket, and FIG. 15 illustrates an example of a mutual conversion between a PrintTicket and a DEVMODE structure.

As illustrated in FIG. 1, a printing system of the present example is composed of print devices 10 configured to execute print processing according to print instructions, and a print instructing device (hereinafter, referred as a computing device 20). The print devices 10 and the computing device 20 are connected together with a communication network such as a LAN (Local Area Network) and a WAN (Wired Area Network).

Print devices 10 can be commonly-known printers and MFPs (Multi-Function Peripherals) both of which can print documents in the XPS (XML Paper Specification) format. Each print device 10 is configured to analyze print data sent from computing device 20, rasterize respective pages of the print data, create image data for the respective pages and print images based on the image data by using an image forming process such as an electrophotograpic process and an electrostatic printing process.

Computing device 20 can be a personal computer or a mobile device (such as a smart phones and a tablet terminal) supporting a Windows operating system. Computing device 20 is composed of components including control section 21, storage section 22, communication I/F (interface) section 23, display section 24 and operation section 25, as illustrated in FIG. 2.

Control section 21 is composed of components including a CPU (Central Processing Unit) 21a and storage devices such as a ROM (Read Only Memory) 21b and a RAM (Random Access Memory) 21c. CPU 21a is configured to read various programs stored in ROM 21b or storage section 22, and then, develop and execute the programs on RAM 21c to implement various functions, where the various programs include programs for controlling operations of computing device 20, an operating system (in the present example, Windows operating system on which a Version 4 printer driver can be executed), application programs and a printer driver for controlling print devices 10 (in the present example, a Version 4 printer driver including a printer driver core section and a print setup UI section which are arranged in separated layers). The application programs, the printer driver core section and the print setup UI section will be described later.

Storage section 22 includes a HDD (Hard Disc Drive) to store various programs, document data and print data.

Communication interface section 23 is composed of a device such as a NIC (Network Interface Card) and a modem, and is configured to perform data communication with print devices 10 through a wireless network or a wired network.

Display section 24 includes a device such as a LCD (Liquid Crystal Display), and is configured to display screens of application programs and screens created by the print setup UI section.

Operation section 25 is composed of devices such as a mouse, a keyboard and a touch sensor formed on display section 24, and is configured to allow a user to perform operations such as creating documents and setting of print features of print devices 10.

FIG. 3 is a block diagram illustrating functions and sections realized by control section 21 of computing device 20. Control section 21 of computing device 20 is configured to execute application programs 30 and execute a printer driver to realize functions of printer driver core section 40 and print setup UI section 50.

Application program 30 is a program to run on an operating system (for example, Microsoft Office which can run on Windows operating systems) and to create document data to be printed.

Printer driver core section 40 is provided as a program to run on an operating system and is configured to send a print instruction to print device 10 in cooperation with application program 30 and print setup UI section 50. The printer driver core section 40 is composed of GPD file 41, "DevModeMap.xml" file 42, configuration processing section 43, JavaScript constraint section 44, rendering processing section 45 and print filter 46.

GPD file 41 is one of configuration files and includes definitions of various print features of print device 10. "DevModeMap.xml" file 42 is provided for defining a data storing area in a private area (an area which can be freely defined by printer vendors) of a DEVMODE structure (a structure defined by Microsoft Corporation, for storing information about print features). Configuration processing section 43 is configured to, by using GPD file 41 and "DevModeMap.xml" file 42, create PrintCapabilities (print capability information), create PrintTicket (print setup information), and invoke the JavaScript constraint section 44, where the PrintCapabilities includes descriptions of setup items of the print features which can be set by users and descriptions of option values available for each setup item of the printing features both described in the XML format, and the PrintTicket includes descriptions of an option value for each setup item, chosen by a user from among the option values described in PrintCapabilities.

JavaScript constraint section 44 is configured to process a PrintTicket and PrintCapabilities to handle a conflict among option items of the print features. For example, under the situation that a setting for a first feature (for example, an imposition feature) and a setting for a second feature (for example, a punching feature) are incompatible, JavaScript constraint section 44 changes one of the settings to be compatible with the other. Further, JavaScript constraint section 44 is configured to edit a PrintTicket and PrintCapabilities by using JavaScript. Rendering processing section 45 is configured to convert print instructions sent from application program 30 into descriptions in language which can be interpreted by print device 10. Print filter 46 is configured to edit drawing commands and print control commands in rendering processing. For example, the print filter 46 edits a PrintTicket in which a character string representing a print feature has been added into an area defined for storing information, to create a PrintTicket which can be interpreted by print device 10.

Print setup UI section 50 is provided as a program to run on an operating system and is composed of PT/PC processing section 51, two-way communication processing section 52, and UI processing section 53.

PT/PC processing section 51 is configured to process (interpret) a PrintTicket and/or PrintCapabilities obtained from printer driver core section 40. PT/PC processing section 51 is further configured to create a PrintTicket defining a print feature on the basis of information having been set on print setup screen 60, incorporate the created PrintTicket into the PrintTicket obtained from the printer driver core section 40, and send back the resulting PrintTicket to the printer driver core section. Two-way communication processing section 52 is configured to conduct a two-way communication with print device 10 and to obtain capability information of print device 10. UI processing section 53 is configured to create print setup screen 60 on the basis of the contents of the PrintTicket and/or PrintCapabilities which has been interpreted by PT/PC processing section 51 and of the capability information obtained by the two-way communication, and to display the resulting print setup screen 60 onto display section 24.

In the present example, there are given descriptions about processing under the situation that GPD file 41 is used as a configuration file to define print features. Alternatively, the way to add a print feature to a PrintTicket of the present example is applicable similarly to the situation that a PPD file is used as the configuration file.

Hereinafter, the way to define a print feature will be descried in more detail with reference to a concrete example of the data description.

FIG. 4 illustrates an example of descriptions of GPD file 41. Each print feature is defined by an element of "*Feature:" illustrated in FIG. 4. An option value of each print feature is defined by an element of "*Option:" illustrated in FIG. 4, as a child element of the "*Feature" element. In this example, there are definitions of options for each of print features, "Orientation" and "PaperSize".

FIG. 5 illustrates an example of descriptions of a "DevModeMap.xml" file. In this example, a certain area to be added to a PrintTicket is defined by elements of "<Property Name="JobPTExtra">" and "<String Length="2048"> </String>", which define an area having the identifier of "JobPTExtra", the data type of string type, the size of 2048 characters. In this file, plural areas can be defined by adding "Property" elements.

FIGS. 6A and 6B illustrate an example of descriptions of processing executed by JavaScript constraint section 44. The "convertPrintTicketToDevMode" function in FIG. 6A performs processing, in the mutual conversion between a PrintTicket and a DEVMODE structure illustrated in FIG. 15, to set the value of the "Value" element of the "ParameterInit: JOBPTExtra" element in the PrintTicket into "JobPTExtra" in the "Private (2)" area of the DEVMODE structure (see 1503 of FIG. 15). Further, the "convertDevModeToPrintTicket" function in FIG. 6B adds a node of "JobPTExtra" to the PrintTicket. With this processing, the node of "<psf:Parameterinit name="ns0000:JobPTExtra"> . . . </psf:Parameterinit>", which is an area for storing information, is added into "PrintTicket(0)" illustrated in FIG. 11, and PrintTicket (1) illustrated in FIG. 12 is created (see the inside of the broken-line frame of FIG. 12). Further, the "convertDevModeToPrintTicket" function performs processing, in the mutual conversion between a PrintTicket and a DEVMODE structure illustrated in FIG. 15, to set the value of "JobPTExtra" in the "Private (2)" area of the DEVMODE structure to the "Value" element of the "ParameterInit: JobPTExtra" element of the PrintTicket (see 1504 of FIG. 15).

FIG. 7 illustrates an example of print setup screen 60. In the print setup screen 60, there are provided input boxes of "USER ID" and "PASSWORD" as print features to be added to a PrintTicket through print setup UI section 50. By using options having been set in these input boxes, PT/PC processing section 51 creates a PrintTicket as print control commands and adds the created PrintTicket into the "Value" element of the "ParameterInit: JobPTExtra" element of PrintTicket(1) illustrated in FIG. 12. In other words, PT/PC processing section 51 adds the created PrintTicket between the lines of "<psf:Value xsi:type="xsd:string">" and "</psf:Value>" in PrintTicket(1), in the CDATA format (adds the description of "<![CDATA . . . ]]>" between these lines). With the processing, PT/PC processing section 51 creates PrintTicket(2) illustrated in FIG. 13 (see the inside of the broken-line frame of FIG. 13).

Then, printer driver core section 40 (print filter 46) converts the PrintTicket(2) illustrated in FIG. 13 into a PrintTicket which can be interpreted by print device 10 as PrintTicket(3) illustrated in FIG. 14 (see the inside of the broken-line frame of FIG. 14). An print instruction is given to print device 10 by using the PrintTicket(3).

Hereinafter, processing (processing of XPS print path) to be implemented in computing device 20 of the present example will be described. CPU 21a executes processes illustrated in the flowchart of FIG. 8 and the sequence diagram of FIG. 9 by developing a printer driver stored in ROM 21b or storage section 22 onto RAM 21c and executing the printer driver. FIG. 9 illustrates an example of processing under the condition that application program 30 and the printer driver (printer drive core section 40) exchange data to each other in the XPS format.

First, application program 30 sends a request of "1. Obtain PrintTicket" in FIG. 9 to printer driver core section 40. Printer driver core section 40 (configuration processing section 43) creates PrintTicket(0) illustrated in FIG. 11 on the basis of the definition in the GPD file in the process of "1.1 Create PrintTicket" in FIG. 9 (S101 of FIG. 8). Then, in the process of "1.2. Add JobPTExtra to PrintTicket" in FIG. 9, printer driver core section 40 (JavaScript constraint section 44) adds a node of "<psf:Parameterinit name="ns0000:JobPTExtra"> . . . </psf:Parameterinit>" into PrintTicket(0) by using the "convertDevModeToPrintTicket" function on the basis of the description of "DevModeMap.xml" file 42, to create PrintTicket(1) illustrated in FIG. 12 (S102 of FIG. 8). Then, printer driver core section 40 sends the created PrintTicket(1) to application program 30.

Next, application program 30 sends print setup UI section 50 an instruction of displaying a print setup UI by using PrintTicket(1), which has been obtained in advance, as a parameter on executing the process of "2. Print setting" in FIG. 9. Print setup UI section 50 (PT/PC processing section 51) interprets PrintTicket(1) and print setup UI section 50 (two-way communication processing section 52) makes a two-way communication with the main body of print device 10 and conducts the process of "2.1.1. Obtain device information". With this process, the print setup UI section 50 obtains capability information of the main body of print device 10.

Next, in the process of "2.1.2 Display UI" in FIG. 9, print setup UI section 50 (UI processing section 53) creates print setup UI screen 40 illustrated in FIG. 7 by using PrintTicket (1) interpreted by PT/PC processing section 51 and the capability information of print device 10 obtained by two-way communication processing section 52. The print setup UI section 50 (UI processing section 53) displays the print setup UI screen 40 onto display section 24 to allow a user to perform print settings thereon. On a completion of the user's print setting operations, print setup UI section 50 updates the PrintTicket. At that time, print setup UI section 50 (PT/PC processing section 51) creates a PrintTicket including a description of information about the print feature to be added on the basis of option items having been set on print setup UI screen 41 (S104 of FIG. 8), and adds, in the process of "2.1.3 Add value to Value of JobPTExtra" in FIG. 9, the created PrintTicket to the "Value" element of the "ParameterInit:JobPTExtra" element in PrintTicket(1) in FIG. 12 in the CDATA format (adds the created PrintTicket as a string, rather than as descriptions of a markup language), to create PrintTicket(2) of FIG. 13 (S104 of FIG. 8). In the current state of PrintTicket (2), the descriptions of "<psf:ParameterInit name="ns0000:AuthUserID"> . . . </psf:Parameterinit>" and "<psf:ParameterInit name="ns0000:AuthPassword"> . . . </psf:Parameterinit>" in the PrintTicket corresponding to the added print features are handled as character strings set in the string elements, and those descriptions cannot be interpreted by print device 10. After that, PrintTicket(2) is sent back to application program 30 through printer driver core section 40.

Next, on executing the process of "3. Print processing" in FIG. 9, application program 30 sends printer driver core section 40 PrintTicket(2) and drawing data in the XPS format as parameters. In the process of "3.1 Add Value of JobPTExtra to PT" in FIG. 9, printer driver core section 40 (print filter 46) reads information set in the CDATA format in the "Value" element of the "ParameterInit: JobPTExtra" in PrintTicket(2) in FIG. 13, as a PrintTicket which can be interpreted by print device 10, moves to the root level of the PrintTicket, deletes the node after "<psf:Parameterinit name="ns0000:JobPTExtra">" of PrintTicket(2) and writes the read PrintTicket into the deleted position. With these processes, printer driver core section 40 (print filter 46) converts the PrintTicket(2) into PrintTicket(3) (S105 of FIG. 8). In PrintTicket(3), the descriptions of "<psf:Parameterinit name="ns0000:AuthUserID"> . . . </psf:ParameterInit>" and "<psf:ParameterInit name="ns0000:AuthPassword"> . . . </psf:Parameterinit>" in the PrintTicket corresponding to the added print features is in the state which can be interpreted by print device 10.

After that, in the process of "3.2. Print Processing" in FIG. 9, PrintTicket(3) and the drawing data in the XPS format are sent to the print device 10, and the print device 10 interprets and outputs PrintTicket(3) in which the print features have been added.

In FIG. 9, there was given an example that application program 30 and the printer driver (printer driver core section 40) exchange data in the XPS format to each other (XPS print path). Alternatively, as illustrated in FIG. 10, the application program 30 and the printer driver (printer driver core section 40) can exchange data to each other through a GDI (Graphics device interface, which is a program provided with a Windows operating system, for conducting graphic processing). The basic flow of processes to be executed in the case of a GDI print path illustrated in FIG. 10 is the same as those in the example of the XPS print path illustrated in FIG. 9, but additionally includes the processes of "conversion processing from PrintTicket to DEVMODE" and "conversion processing from DEVMODE to PrintTicket", because there is a need to exchange data between application 30 and printer driver core section 40 by using a DEVMODE structure, which can be handled by Windows operating systems, rather than a PrintTicket.

In concrete terms, after the process of "1.2. Add JobPTExtra to PrintTicket" in FIG. 10, printer driver core section 40 (JavaScript constraint section 44) executes the process of "1.3. PrintTicket to DEVMODE" and sends application program 30 DEVMODE(1) prepared by converting PrintTicket (1) into a DEVMODE in place of PrintTicket(1). Further, in the process of "2. Print Setting", printer driver core section 40 (JavaScript constraint section 44) executes the process of "2.1. DEVMODE to PrintTicket" and sends PrintTicket(1) to print setup UI section 50.

Similarly to the above, after the process of "2.2.3. Add value to Value of JobPTExtra in FIG. 10, printer driver core section 40 (JavaScript constraint section 44) executes the process of "2.3. PrintTicket to DEVMODE" and sends application program 30 DEVMODE(2) prepared by converting PrintTicket(2) into a DEVMODE in place of PrintTicket(2). Further, in the process of "3. Print Processing", printer driver core section 40 (JavaScript constraint section 44) executes the process of "3.1. DEVMODE to PrintTicket" and sends PrintTicket(3) to print device 10.

FIG. 15 schematically illustrates processes of the mutual conversion between a PrintTicket and a DEVMODE structure described above. A DEVMODE structure is composed of separated parts: a public section and one or more of private sections, where the structure of the public section is defined by Microsoft Corporation so that the public section is a common area to vendors, and the structure of the private section can be defined by each vendor independently. Depending on definitions in a GPD file, corresponding areas are automatically secured in the public section and the "Private(1)" section of the DEVMODE structure. Further, on the basis of a definition in a "DevModeMap.xml" file, a corresponding area is secured the "Private(2)" section of the DEVMODE structure (1505 in FIG. 15).

In the mutual exchange, a PrintTicket, and the public section and "Private(1)" section of a DEVMODE structure are mutually converted automatically (see 1501 and 1502 of FIG. 15). The "Private(2)" section and a PrintTicket are mutually converted by using the "convertPrintTicketToDevMode" function and the "convertDevModeToPrintTicket" function in JavaScript constraint section 44 (see 1503 and 1504 of FIG. 15).

As described above, to add an extra print feature to the PrintTicket to be sent to a print device, printer driver core section 40 creates PrintTicket(1) prepared by defining an area for adding a print feature (an area for storing information) therein, and sends the created PrintTicket(1) to print setup UI section 50. Print setup UI section 50 creates a PrintTicket including a description of information about an extra print feature, incorporates the PrintTicket into the area defined in PrintTicket(1) to create PrintTicket(2), and sends PrintTicket(2) to printer driver core section 40. Printer driver core section 40 converts PrintTicket(2) into PrintTicket(3) which can be interpreted by print device 10 and sends PrintTicket(3) to print device 10. With these processes, there can be provided a printer driver which allows a user to add an extra print feature to PrintTicket easily.

Example 2

Figure 16:
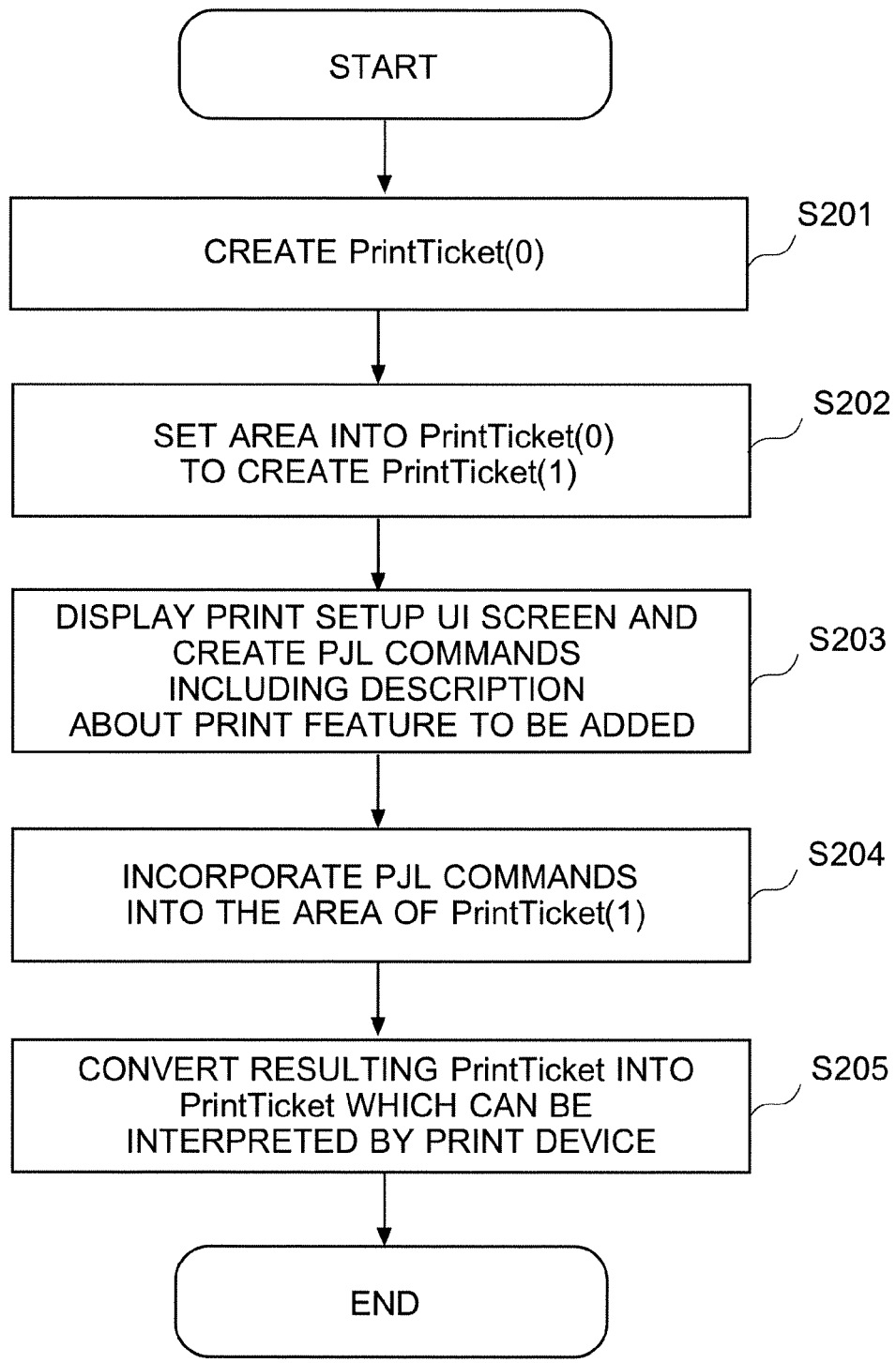
FIG. 16 is a flowchart illustrating processing of a printer driver relating to Example 2.

Next, a printer driver relating to Example 2 and a method of adding a print feature to a PrintTicket outputted from the printer driver will be described with reference to FIG. 16. FIG. 16 is a flowchart illustrating processing of the printer driver of the present example.

The basic constitution of the printing system of the present example is the same as that of Example 1, but is different in the following features. In the present example, PT/PC processing section 51 of print setup UI section 50 makes a description of an extra print feature in PJL commands such as PCL (Printer Control language) and PS (Post Script, which is a page description language developed by Adobe Systems Incorporated), incorporates the PJL commands into the area defined in a PrintTicket as print control commands. Printer driver core section 40 converts the PrintTicket in which the PJL commands are incorporated, into a PrintTicket which can be interpreted by Print device 10.

Hereinafter, processing of computing device 20 of the present example will be described. CPU 21*a* is configured to execute processes illustrated in the flowchart of FIG. 16, by developing and executing on RAM 21*c* a printer driver stored in ROM 21*b* or storage section 22.

First, application program 30 sends a request of obtaining a PrintTicket to printer driver core section 40. Printer driver core section 40 (configuration processing section 43) creates PrintTicket(0) illustrated in FIG. 11, on the basis of the definition in the GPD file (S201 of FIG. 16). Then, printer driver core section 40 (JavaScript constraint section 44) adds a node into PrintTicket(0) by using the "convertDevModeToPrintTicket" function on the basis of the description of "DevModeMap.xml" file 42, to create PrintTicket(1) illustrated in FIG. 12 (S202 of FIG. 16). Then, printer driver core section 40 sends the created PrintTicket(1) to application program 30.

Next, application program 30 sends print setup UI section 50 an instruction of displaying a print setup UI by using PrintTicket(1) as a parameter. Print setup UI section 50 (PT/PC processing section 51) interprets PrintTicket(1) and print setup UI section 50 (two-way communication processing section 52) makes a two-way communication with the main body of print device 10 to obtain capability information of the main body of print device 10. Then, print setup UI section 50 (UI processing section 53) displays the print setup UI screen 40 (see FIG. 7) onto display section 24 to allow a user to perform print settings thereon. On a completion of the user's print setting operations, print setup UI section 50 (PT/PC processing section 51) creates PJL commands including a description of information about the print feature to be added (S203 of FIG. 16), and interpolates the created PJL commands into PrintTicket(1) (S204 of FIG. 16). After that, PrintTicket(1) in which the PJL commands are incorporated is sent back to application program 30 through printer driver core section 40.

Next, application program 30 sends printer driver core section 40 an instruction of print processing by using PrintTicket(1) in which the PJL commands are incorporated and drawing data in the XPS format as parameters. Printer driver core section 40 (print filter 46) reads PrintTicket(1) in which PJL commands are incorporated and convers the PrintTicket(1) into a PrintTicket which can be interpreted by print device 10 (S205 of FIG. 16). After that, the resulting PrintTicket and the drawing data are sent from printer driver core section 40 to the print device 10, and the print device 10 interprets and outputs the PrintTicket in which the print feature has been added.

As described above, print setup UI 50 creates PJL commands as print control commands to define the added print feature and printer driver core section 40 convers a PrintTicket in which the PJL commands are incorporated into another PrintTicket which can be interpreted by print device 10. With these processes, there can be provided a printer driver which allows a user to easily add an extra print feature to the PrintTicket as output of the printer driver, similarly to Example 1.

Also in the present example, a PPD file can be used as the configuration file for defining print features in place of GPD file 41. Further, the application program 30 and the printer driver (printer driver core section 40) may exchange data to each other through a GDI, which can be realized by adding the processes of "PrintTicket to DEVMODE" and "DEVMODE to PrintTicket" to the above-described processes to conduct a mutual conversion between a PrintTicket and a DEVMODE structure, similarly to Example 1.

Example 3

Figure 17:
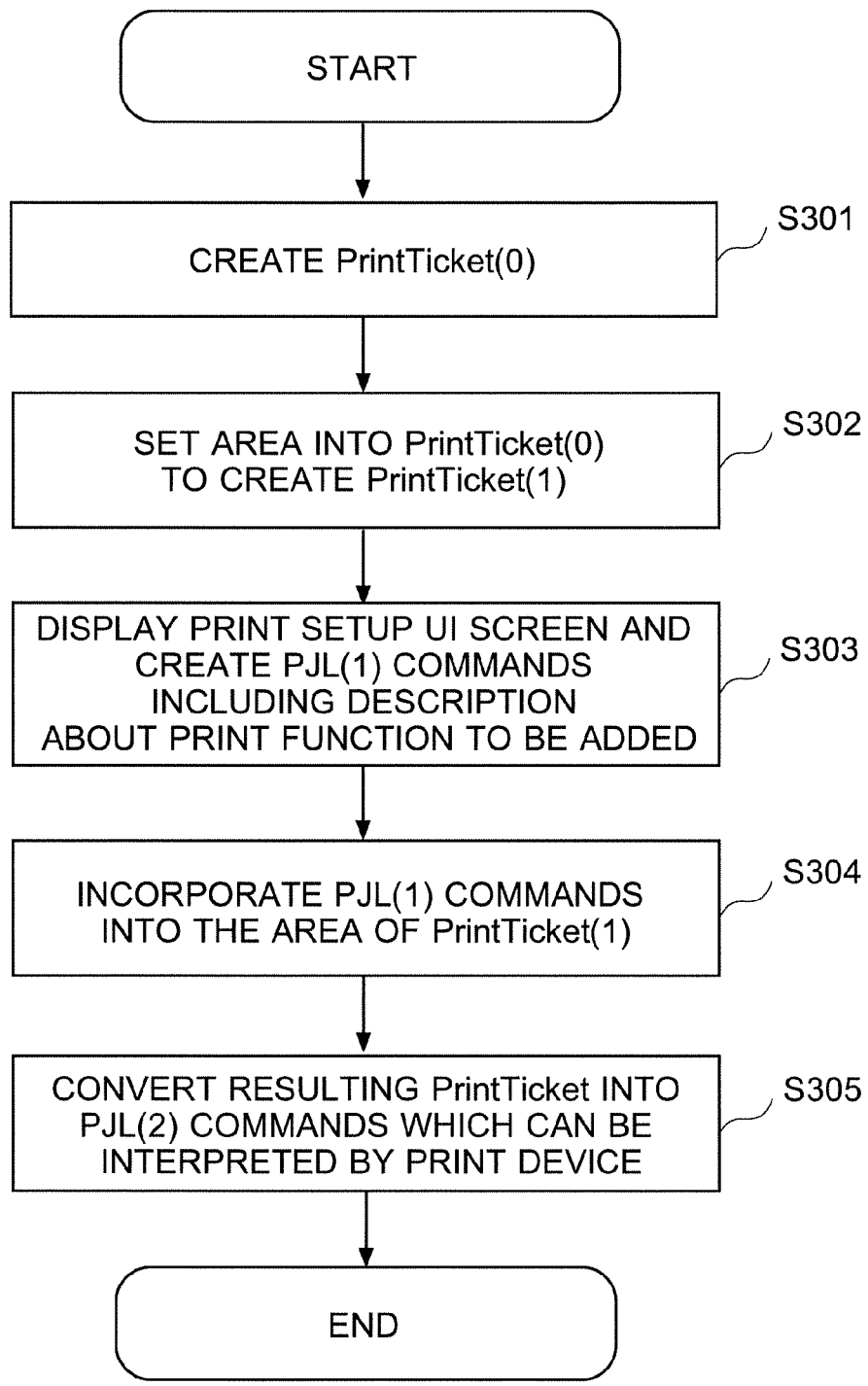
FIG. 17 is a flowchart illustrating processing of a printer driver relating to Example 3.

Next, a printer driver relating to Example 3 and a method of adding a print feature to PJL commands outputted from the printer driver will be described with reference to FIG. 17. FIG. 17 is a flowchart illustrating processing of the printer driver of the present example.

The basic constitution of the printing system of the present example is the same as that of Example 1, but is different in the following features. In the present example, print device 10 does not have a function to process print data in the XPS format and can process print data described in PJL. PT/PC processing section 51 of print setup UI section 50 creates PJL commands defining an extra print feature, incorporates the PJL commands into a PrintTicket. Printer driver core section 40 converts the PrintTicket in which the PJL commands are incorporated, into a PJL commands which can be interpreted by Print device 10.

Hereinafter, processing of computing device 20 of the present example will be described. CPU 21a is configured to execute processes illustrated in the flowchart of FIG. 17, by developing and executing on RAM 21c a printer driver stored in ROM 21b or storage section 22.

First, application program 30 sends a request of obtaining a PrintTicket to printer driver core section 40. Printer driver core section 40 (configuration processing section 43) creates PrintTicket(0) illustrated in FIG. 11, on the basis of the definition in the GPD file (S301 of FIG. 17). Then, printer driver core section 40 (JavaScript constraint section 44) adds a node into PrintTicket(0) by using the "convertDevModeToPrintTicket" function on the basis of the description of "DevModeMap.xml" file 42, to create PrintTicket(1) illustrated in FIG. 12 (S302 of FIG. 17). Then, printer driver core section 40 sends the created PrintTicket(1) to application program 30.

Next, application program 30 sends print setup UI section 50 an instruction of displaying a print setup UI by using PrintTicket(1) as a parameter. Print setup UI section 50 (PT/PC processing section 51) interprets PrintTicket(1) and print setup UI section 50 (two-way communication processing section 52) makes a two-way communication with the main body of print device 10 to obtain capability information of the main body of print device 10. Then, print setup UI section 50 (UI processing section 53) displays the print setup UI screen 40 (see FIG. 7) onto display section 24 to allow a user to perform print settings thereon. On a completion of the user's print setting operations, print setup UI section 50 (PT/PC processing section 51) creates PJL commands (hereinafter, referred to as PJL(1) commands) including a description of information about the print feature to be added (S303 of FIG. 17), and interpolates the created PJL commands into PrintTicket(1) (S304 of FIG. 17). After that, PrintTicket(1) in which the PJL(1) commands are incorporated is sent back to application program 30 through printer driver core section 40.

Next, application program 30 sends printer driver core section 40 an instruction of print processing by using PrintTicket(1) in which the PJL(1) commands are incorporated and drawing data in the XPS format as parameters. Printer driver core section 40 (print filter 46) reads PrintTicket(1) in which the PJL(1) commands are incorporated and convers the PrintTicket(1) into PJL commands (referred to as PJL(2) commands) which can be interpreted by print device 10 (S305 of FIG. 17). After that, the PJL(2) commands and the drawing data are sent from printer driver core section 40 to the print device 10, and the print device 10 interprets and outputs the PJL(2) commands in which the print feature has been added.

As described above, print setup UI 50 creates PJL commands as print control commands to define the added print feature and printer driver core section 40 convers a PrintTicket in which the PJL commands are incorporated into PJL commands which can be interpreted by print device 10. With these processes, there can be provided a printer driver which allows a user to easily add an extra print feature to PJL commands as output of the printer driver, similarly to Example 1.

Also in the present example, a PPD file can be used as the configuration file for defining print features in place of GPD file 41. Further, the application program 30 and the printer driver (printer driver core section 40) may exchange data to each other through a GDI, which can be realized by adding the processes of "PrintTicket to DEVMODE" and "DEVMODE to PrintTicket" to the above-described processes to conduct a mutual conversion between a PrintTicket and a DEVMODE structure, similarly to Example 1.

The scope of the present invention is not limited to the aforementioned embodiments and examples. Disclosed configurations of the aforementioned printer driver and the disclosed method of adding a print feature to print instructing information outputted by the printer driver can be varied by a skilled person without departing from the spirit and scope of the invention.

The invention claimed is:

1. A non-transitory computer-readable storage medium storing a printer driver to be executed in a computing device, the computing device being capable of instructing a print device to perform printing, the printer driver, when being executed by a processor of the computing device, causing the processor to function as a printer driver core section and a print setup user interface section and causing the printer driver core section and the print setup user interface section to perform processing comprising:

creating a PrintTicket including a description of information about a print feature by the printer driver core section;

defining an area for storing information in the PrintTicket by the printer driver core section, to create a first PrintTicket and send the first PrintTicket to the print setup user interface section;

creating a print setup screen by using the first PrintTicket, by the print setup user interface section;

operating a display section of the computing device to display the print setup screen, by the print setup user interface section;

creating another PrintTicket and incorporating the another PrintTicket into the area of the first PrintTicket, by the print setup user interface section, to create a second PrintTicket and send the second PrintTicket to the printer driver core section, the another PrintTicket including a description of information about another print feature having been inputted on the print setup screen; and converting the second PrintTicket into a third PrintTicket which can be interpreted by the print device, by the printer driver core section, wherein the printer driver core section includes a JavaScript (registered trademark) constraint section, and the defining the area includes adding a certain description into the PrintTicket including the description of the information about the print feature, by the JavaScript constraint section, the certain description being prepared by converting information having been written in a private area of a DEVMODE structure by using a predetermined function.

2. The non-transitory computer-readable storage medium of claim 1, wherein the incorporating the another PrintTicket into the area of the first PrintTicket includes adding a character string being the description of the information about the another print feature, into the area of the first PrintTicket, by the print setup user interface section and the converting the second PrintTicket includes interpreting the character string and converting the character string into a description in a PrintTicket format, by the printer driver core section.

3. The non-transitory computer-readable storage medium of claim 1, wherein the processing further comprises performing by the printer driver core section an exchange of information through a graphic device interface with an application program which can create a document to be printed, and the performing the exchange of information includes performing a mutual conversion between the PrintTicket and the DEVMODE structure by using a predetermined function, by the JavaScript constraint section.

4. The non-transitory computer-readable storage medium of claim 1, wherein the print setup user interface section includes a two-way communication section and the creating the print setup screen includes obtaining capability information of the print device by the two-way communication section, and creating the print setup screen by using the first PrintTicket and the capability information, by the print setup user interface section.

5. The non-transitory computer-readable storage medium of claim 1, wherein the printer driver is a version 4 printer driver to be executed on a Windows (a registered trademark) operating system.

6. A non-transitory computer-readable storage medium storing a printer driver to be executed in a computing device, the computing device being capable of instructing a print device to perform printing, the printer driver, when being executed by a processor of the computing device, causing the processor to function as a printer driver core section and a print setup user interface section and causing the printer driver core section and the print setup user interface section to perform processing comprising:

creating a PrintTicket including a description of information about a print feature by the printer driver core section;

defining an area for storing information in the PrintTicket by the printer driver core section, to create a first PrintTicket by and send the first PrintTicket to the print setup user interface section;

creating a print setup screen by using the first PrintTicket, by the print setup user interface section;

operating a display section of the computing device to display the print setup screen, by the print setup user interface section;

creating PJL commands and incorporating the PJL commands into the area of the first PrintTicket, by the print setup user interface section, to create a second PrintTicket and send the second PrintTicket to the printer driver core section, the PJL commands including a description of information about another print feature having been inputted on the print setup screen; and converting the second PrintTicket into a third PrintTicket which can be interpreted by the print device, by the printer driver core section, wherein the printer driver core section includes a JavaScript (registered trademark) constraint section, and the defining the area includes adding a certain description into the PrintTicket including the description of the information about the print feature, by the JavaScript constraint section, the certain description being prepared by converting information having been written in a private area of a DEVMODE structure by using a predetermined function.

7. The non-transitory computer-readable storage medium of claim 6, wherein the printer driver is a version 4 printer driver to be executed on a Windows (a registered trademark) operating system.

8. A non-transitory computer-readable storage medium storing a printer driver to be executed in a computing device, the computing device being capable of instructing a print device to perform printing, the printer driver, when being executed by a processor of the computing device, causing the processor to function as a printer driver core section and a print setup user interface section and causing the printer driver core section and the print setup user interface section to perform processing comprising:

creating a PrintTicket including a description of information about a print feature by the printer driver core section;

defining an area for storing information in the PrintTicket by the printer driver core section, to create a first PrintTicket by and send the first PrintTicket to the print setup user interface section;

creating a print setup screen by using the first PrintTicket, by the print setup user interface section;

operating a display section of the computing device to display the print setup screen, by the print setup user interface section;

creating first PJL commands and incorporating the first PJL commands into the area of the first PrintTicket, by the print setup user interface section, to create a second PrintTicket and send the second PrintTicket to the printer driver core section, the first PJL commands including a description of information about another print feature having been inputted on the print setup screen; and converting the second PrintTicket into second PJL commands which can be interpreted by the print device, by the printer driver core section, wherein the printer driver core section includes a JavaScript (registered trademark) constraint section, and the defining the area includes adding a certain description into the PrintTicket including the description of the information about the print feature, by the JavaScript constraint section, the certain description being prepared by converting information having been written in a private area of a DEVMODE structure by using a predetermined function.

9. The non-transitory computer-readable storage medium of claim 8, wherein the printer driver is a version 4 printer driver to be executed on a Windows (a registered trademark) operating system.

10. A method of adding a print feature to output of a printer driver to be executed in a computing device, the computing device being capable of instructing a print device to perform printing, the method comprising:

creating a PrintTicket including a description of information about a print feature;

defining an area for storing information in the PrintTicket, to create a first PrintTicket; creating a print setup screen by using the first PrintTicket;

operating a display section of the computing device to display the print setup screen;

creating another PrintTicket and incorporating the another PrintTicket into the area of the first PrintTicket, to create a second PrintTicket, the another PrintTicket including a description of information about another print feature having been inputted on the print setup screen; and converting the second PrintTicket into a third PrintTicket which can be interpreted by the print device, wherein a printer driver core section includes a JavaScript (registered trademark) constraint section, and the defining the area includes adding a certain description into the PrintTicket including the description of the information about the print feature, by the JavaScript constraint section, the certain description being prepared by converting information having been written in a private area of a DEVMODE structure by using a predetermined function.

11. The method of claim 10, wherein the incorporating the another PrintTicket into the area of the first PrintTicket includes adding a character string being the description of the information about the another print feature, into the area of the first PrintTicket, and the converting the second PrintTicket includes interpreting the character string and converting the character string into a description in a PrintTicket format.

12. The method of claim 10, further comprising performing an exchange of information through a graphic device interface with an application program which can create a document to be printed, wherein the performing the exchange of information includes performing a mutual conversion between the PrintTicket and the DEVMODE structure by using a predetermined function.

13. The method of claim 10, wherein the creating the print setup screen includes obtaining capability information of the print device and creating the print setup screen by using the first PrintTicket and the capability information.

14. The method of claim 10, wherein the printer driver is a version 4 printer driver to be executed on a Windows (a registered trademark) operating system.

15. A method of adding a print feature to output of a printer driver to be executed in a computing device, the computing device being capable of instructing a print device to perform printing, the method comprising:

creating a PrintTicket including a description of information about a print feature;

defining an area for storing information in the PrintTicket, to create a first PrintTicket;

creating a print setup screen by using the first PrintTicket;

operating a display section of the computing device to display the print setup screen;

creating PJL commands and incorporating the PJL commands into the area of the first PrintTicket, to create a second PrintTicket, the PJL commands including a description of information about another print feature having been inputted on the print setup screen; and converting the second PrintTicket into a third PrintTicket which can be interpreted by the print device, wherein a printer driver core section includes a JavaScript (registered trademark) constraint section, and the defining the area includes adding a certain description into the PrintTicket including the description of the information about the print feature, by the JavaScript constraint section, the certain description being prepared by converting information having been written in a private area of a DEVMODE structure by using a predetermined function.

16. The method of claim 15, wherein the printer driver is a version 4 printer driver to be executed on a Windows (a registered trademark) operating system.

17. A method of adding a print feature to output of a printer driver to be executed in a computing device, the computing device being capable of instructing a print device to perform printing, the method comprising:

creating a PrintTicket including a description of information about a print feature;

defining an area for storing information in the PrintTicket, to create a first PrintTicket;

creating a print setup screen by using the first PrintTicket;

operating a display section of the computing device to display the print setup screen;

creating first PJL commands and incorporating the first PJL commands into the area of the first PrintTicket, to create a second PrintTicket, the first PJL commands including a description of information about another print feature having been inputted on the print setup screen; and converting the second PrintTicket into second PJL commands which can be interpreted by the print device, wherein a printer driver core section includes a JavaScript (registered trademark) constraint section, and the defining the area includes adding a certain description into the PrintTicket including the description of the information about the print feature, by the JavaScript constraint section, the certain description being prepared by converting information having been written in a private area of a DEVMODE structure by using a predetermined function.

18. The method of claim 17, wherein the printer driver is a version 4 printer driver to be executed on a Windows (a registered trademark) operating system.

* * * * *